July 14, 1964
R. L. DIETERT
3,141,129
PIVOTING PROBE STRUCTURE FOR ELECTRICALLY SENSING THE
MOISTURE CONTENT OF A MOVING GRANULAR MATERIAL
Filed Oct. 3, 1960
2 Sheets-Sheet 1
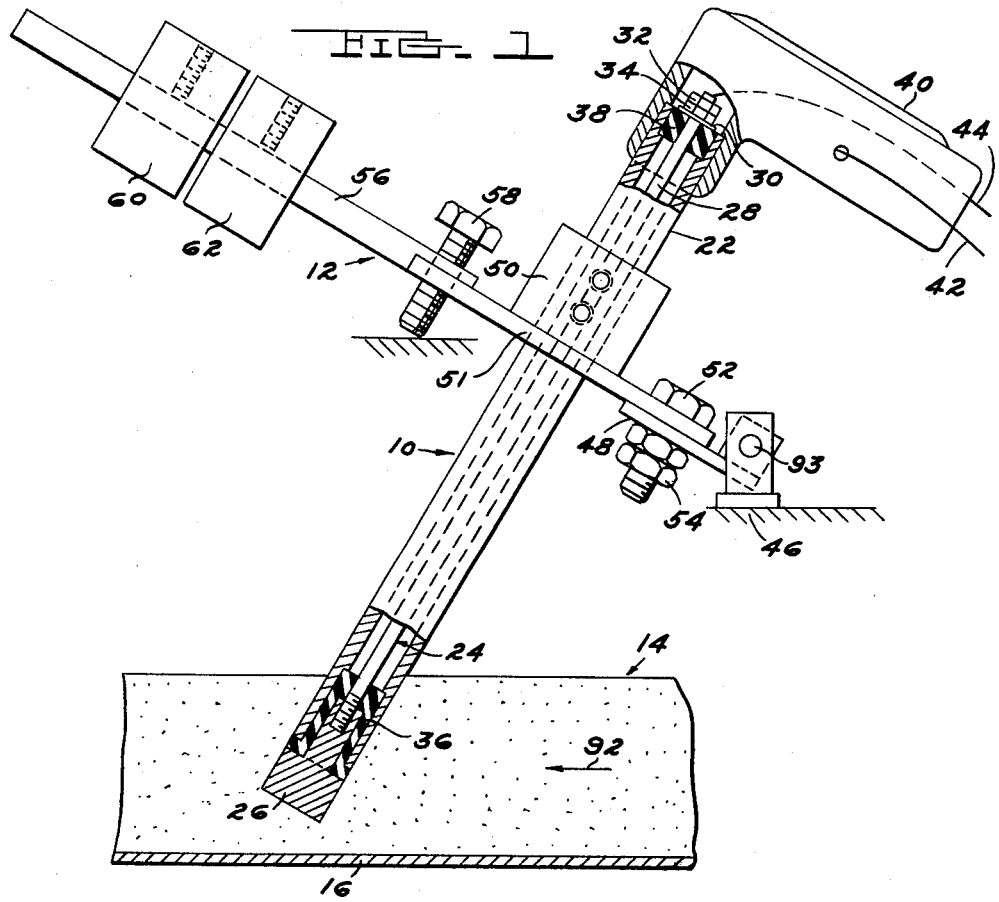
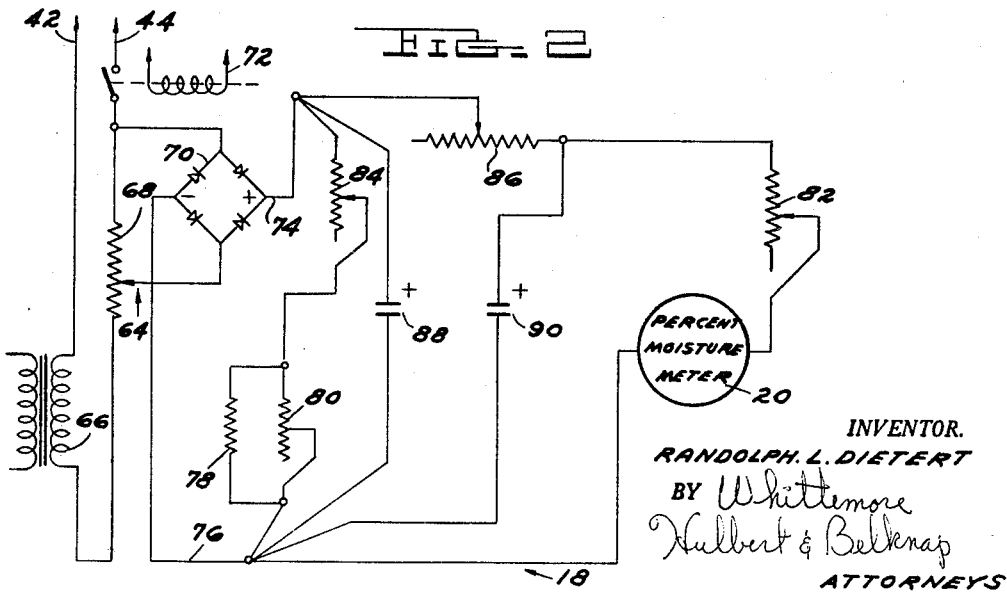
INVENTOR.
RANDOLPH. L. DIETERT
BY Whittemore
Hulbert & Belknap
ATTORNEYS July 14, 1964 R. L. DIETERT 3,141,129
PIVOTING PROBE STRUCTURE FOR ELECTRICALLY SENSING THE
MOISTURE CONTENT OF A MOVING GRANULAR MATERIAL
Filed Oct. 3, 1960 2 Sheets-Sheet 2
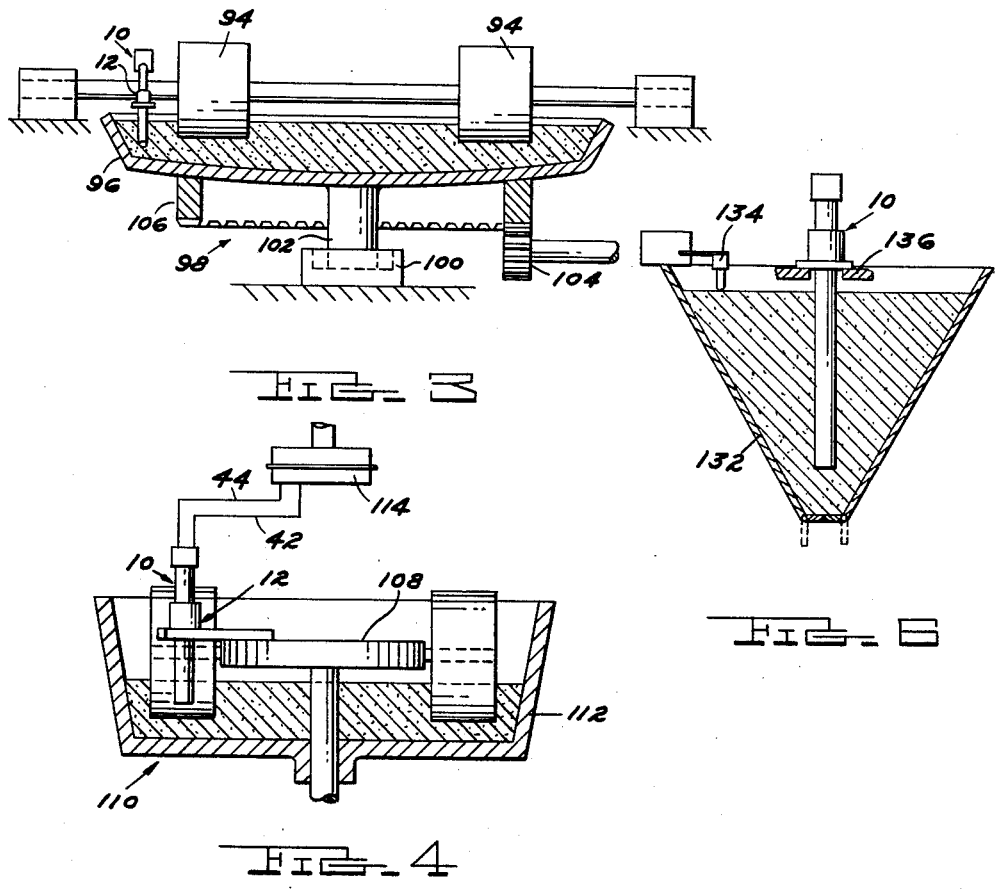
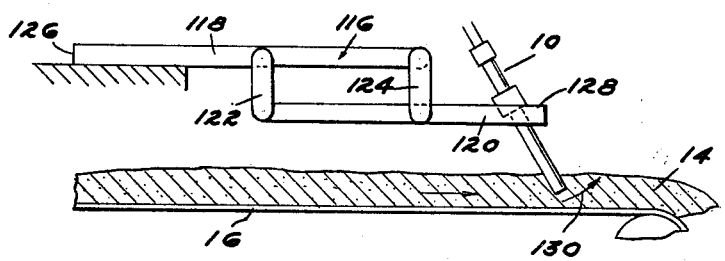
INVENTOR.
RANDOLPH L. DIETERT
BY Whittemore
Hulbert & Belknap
ATTORNEYS

United States Patent Office 3,141,129
Patented July 14, 1964

3,141,129
PIVOTING PROBE STRUCTURE FOR ELECTRICALLY SENSING THE MOISTURE CONTENT OF A MOVING GRANULAR MATERIAL
Randolph L. Dietert, Detroit, Mich., assignor to Harry W. Dietert Co., a corporation of Michigan
Filed Oct. 3, 1960, Ser. No. 60,005
7 Claims. (Cl. 324—65)

The invention relates to measuring devices, and refers more specifically to an electronic probe and means for maintaining the pressure exerted thereon by a material in which it is inserted at a substantially constant value.

In measuring the moisture content of granular material electrically, variations in the composition, temperature and pressure of the granular material produce undesirable variations in the moisture content measurement. The variations in each of these quantities have previously been satisfactorily compensated for in batch type operations. In addition, the variations in temperature and sand composition can be corrected for in measuring the moisture content of moving granular material by known methods. It is also imperative, however, that means be provided in devices for measuring the moisture content of moving granular material to compensate for the variable pressure the moving granular material normally exerts on the moisture sensing element of the moisture measuring device.

It is therefore one of the objects of the present invention to provide a moisture sensing probe and mounting apparatus therefor for compensating for the variable pressure exerted on the probe by moving granular material in which the probe is inserted.

Another object is to provide an electronic moisture sensing probe adapted to be inserted in a moving granular material which probe is pivotally mounted to a fixed support for arcuate movement in the direction of movement of the granular material whereby the pressure between the probe and granular material is maintained substantially constant.

Another object is to provide an electronic probe as set forth above wherein adjustable counterweights are secured to the probe whereby the substantially constant pressure between the probe and moving granular material in which the probe is inserted may be varied.

Another object is to provide an electronic probe comprising a tubular, grounded outer electrode, an inner electrode extending through one end of the outer electrode and means insulating the inner electrode from the outer electrode.

Another object is to provide an electronic probe as set forth above in combination with means for developing an electric signal proportional to the moisture content of granular material in which the probe is inserted, means for compensating the electric signal developed for the temperature of the granular material and the composition of the granular material, and means for indicating the corrected electric signal.

Another object is to provide an electronic probe as set forth above which is secured to stationary muller wheels of a batch type mixer of moist granular material for sensing the moisture content of the batches of granular material during operation of the mixer.

Another object is to provide an electronic probe as set forth above which is mounted on the rotating portion of a batch type mixer of moist granular material for sensing the moisture content of the batches of granular material during operation of the mixer.

Another object is to provide an electronic probe as set forth above and including a parallelogram mounting device for maintaining the pressure on the probe of moving granular material in which the probe is inserted at a substantially constant value.

Another object is to provide an electronic probe as set forth above adapted to be inserted into granular material for measuring the moisture content thereof under constant pressure conditions in conjunction with a leveling device for the granular material.

Another object is to provide an electronic probe as set forth above which is simple in construction, economical to manufacture, and efficient in use.

Other objects and features of the invention will become apparent as the description proceeds, especially when taken in conjunction with the accompanying drawings, illustrating preferred embodiments of the invention, wherein:

FIGURE 1 is an elevational view of an electronic moisture probe and mounting means therefor constructed in accordance with the invention.

FIGURE 2 is a partially schematic and partially diagrammatic representation of a meter circuit for use with the electronic probe illustrated in FIGURE 1.

FIGURE 3 is a diagrammatic illustration of the electronic probe of FIGURE 1 mounted in a fixed position relative to a rotating container of a batch mixer for moist granular material.

FIGURE 4 is a diagrammatic illustration of the electronic probe of FIGURE 1 mounted on a rotating portion of a batch type mixer for moist granular material.

FIGURE 5 is a diagrammatic illustration of a moisture probe as set forth in FIGURE 1 showing modified mounting apparatus therefor for maintaining the sand pressure against the probe substantially constant.

FIGURE 6 is a diagrammatic illustration of the moisture probe of the invention in assembly with a container for static granular material, the moisture content of which is to be measured.

With particular reference to the drawings, one embodiment of the present invention will now be disclosed.

In accordance with the invention, the electronic moisture sensing probe 10 is secured in mounting apparatus 12 so that granular material such as sand 14 moving on a conveyor belt 16 exerts a substantially constant pressure on the probe 10 as it passes therearound. The moisture probe 10 in conjunction with mounting apparatus 12 therefor, and meter circuit 18 produces a pressure compensated electric signal proportional to the moisture content of the moving sand in which the probe is inserted. The pressure compensated electric signal is then compensated for variations in the composition of the sand and the temperature thereof in meter circuit 18. Indicator 20 provides means for visual display of the pressure composition and temperature compensated electric signal in terms of the moisture content of the sand passing the electric probe.

More specifically, the electronic probe 10 illustrated best in FIGURE 1 comprises an elongated tubular outer electrode 22 which is connected directly to ground through mounting apparatus 12. An inner electrode 24 including the exposed end member 26, rod 28, washer 30 and bolts 32 and 34, is also a part of the probe structure. The outer electrode 22 and the inner electrode 24 are separated by the insulating members 36 and 38 secured within the opposite ends of the outer electrode 22. The insulating member 36 provides the exact spacing between the outer electrode 22 and the inner electrode 24 necessary to provide accurate moisture indications with the probe supported as shown so that the depth of the probe in the moving sand varies to maintain a substantially constant pressure of the sand against the probe.

As shown in FIGURE 1, the probe 10 also includes insulated connecting means 40 through which conductors 42 and 44, connected to the grounded outer electrode 22, and the inner electrode 24 by means of bolts 32 and 34, are passed. The conductors 42 and 44 are connected to the meter circuit 18 as shown in FIGURE 2.

Mounting apparatus 12, best shown in FIGURE 1, includes the bracket 46 rigidly secured in a permanent position, the pivot member 48 pivotally secured to the bracket 46, mounting collar 50 secured to the pivot member 48 by means of bolt 52 and nuts 54 and adapted to adjustably support the electronic probe 10. The mounting apparatus 12 further includes the lever arm 56 and collar 50 welded to platform 51, an adjusting screw 58 and balance weights 60 and 62 secured thereto for movement longitudinally thereof.

Meter circuit 18 comprises a signal developing circuit 64 for producing an electric signal proportional to the moisture content of the sand passing the electronic probe 10 which signal is compensated for sand pressure due to mounting probe 10 on apparatus 12. The signal developing circuit 64 includes the transformer 66, resistor 68, a rectifier 70, and appropriate probe circuit safety relay 72. The electric signal proportional to the moisture content of the granular material passing the probe from the signal developing circuit 64 is developed across conductors 74 and 76 as will be understood by those in the art.

Meter circuit 18 further includes the temperature compensating resistors 78 and 80, the coarse and fine sand factor resistors 82 and 84 for compensating for the composition of various sands passing the probe 10, and the filter resistor 86 and associate capacitors 88 and 90.

Thus, in the meter circuit 18 the electric signal developed proportional to the moisture content of the sand passing the moisture probe is compensated to correct for both the temperature of the sand and the composition thereof. After being filtered the electric signal is fed to the indicator 20 which may be calibrated directly in percentage of moisture in the sand passing the electronic probe 10.

In operation, the probe 10 is mounted by means of mounting apparatus 12 above the conveyor 16 along which sand, the moisture content of which it is desired to measure, is passed in the direction of arrow 92. The electronic probe is connected to the meter circuit 18 which may be located at a convenient point adjacent to the conveyor. The weights 60 and 62 are adjusted along the lever arm 56 to provide the desired pressure between the probe 10 and the sand 14 as the sand passes by the probe.

The sand 14 passing by the probe 10 will tend to move the probe in a clockwise direction, which tendency will be counteracted by the tendency of the weights 60 and 62 to move the probe in a counterclockwise direction in opposition to the moving sand. Thus, the probe 10 and weights 60 and 62 will pivot about pivot pin 93 to move further into or out of the sand 14 thereby relieving excess pressures exerted by the sand on the probe. The sand pressure on the probe will therefore tend to remain contant, which is the desired result. The adjusting screw 58 is provided to adjust the depth to which the probe 10 is initially inserted into the sand and below which it will not be permitted to extend.

In FIGURE 3 there is shown an electronic probe 10 mounted by means of apparatus 12 on stationary muller wheels 94 for measuring the moisture content of the sand moving in a rotating container 96 of the mixing apparatus 98. As illustrated, the container 96 is supported in bearing 100 on shaft 102 for rotation by means of a drive pinion 104 in mesh with the ring gear 106.

Alternatively, the electronic probe 10 can be mounted on the rotating portion 108 of the mixing apparatus 110 illustrated in FIGURE 4 by means of the mounting apparatus 12 shown in FIGURE 1. With such construction the container 112 is maintained stationary and the conductors 42 and 44 from the electronic probe 10 are connected to the meter circuit 18 through commutator 114.

In FIGURE 5 a modification of the mounting apparatus 12 is illustrated. The mounting apparatus 116 illustrated in FIGURE 5 comprises the horizontally extending parallel members 118 and 120 secured together by the members 122 and 124, which are of the same length and are pivoted at opposite ends to the members 118 and 120 as shown. The member 118 is fixed at the end 126 to a rigid support, while the electronic probe 10 is supported on the end 128 of the member 120.

Thus, in operation of the mounting apparatus illustrated in FIGURE 5 when the pressure of the sand 14 on conveyor 16 increases against the probe 10, the probe 10 is moved arcually in the direction of arrow 130 to tend to relieve the pressure thereon whereby the pressure of the granular material acting against the probe 10 is maintained substantially constant. If desired, of course, weights can be used in conjunction with the modified mounting apparatus 116 illustrated in FIGURE 5 to provide pressure adjustment as previously indicated.

FIGURE 6 illustrates the use of the electronic probe 10 of the invention in conjunction with a container in which static sand is maintained at a predetermined level by the leveling device 134. It will be understood that with the probe 10 supported from a fixed support 136 in granular material which is substantially static and at a constant level, the pressure exerted thereon by the granular material will be constant for each level. The electric signal developed for use in the meter circuit 18 will not therefore require compensation for pressure variations in the granular material.

The drawings and the foregoing specification constitute a description of the improved electronic probe for measuring the moisture content of a moving material in such full, clear, concise and exact terms as to enable any person skilled in the art to practice the invention, the scope of which is indicated by the appended claims.

What I claim as my invention is:

1. Structure for electrically sensing the moisture content of moving granular material comprising a probe including an elongated, hollow cylindrical outer electrode, an insulating member in each end of the cylindrical electrode, an elongated inner electrode extending longitudinally of the outer electrode centrally thereof and extending through and supported by the insulating members at the opposite ends of the outer electrode in electrical isolation from the outer electrode, means for connecting the opposite terminals of a source of electricity to the inner and outer electrodes and means fixedly located at a sensing position for pivotally mounting the probe in different selected axial positions with respect to the surface of the moving granular material and so that one end of the probe extends different substantial distances into the granular material with the probe making different obtuse angles with the surface of the granular material, said pivot mounting providing for arcuate movement of the probe in the direction of the movement of the granular material to maintain a substantially constant pressure on the end of the probe extending into the granular material.

2. Structure for electrically sensing the moisture content of moving granular material comprising a probe including an elongated, hollow cylindrical outer electrode having a portion at each end with an enlarged inner diameter, an annular insulating member inserted within the enlarged diameter portion at one end of the outer electrode, a hat-shaped insulating member having an axial opening therethrough positioned within the enlarged diameter portion at the other end of the outer electrode and extending over the other end thereof, a second electrode including a cylindrical electrode tip having a reduced diameter portion positioned within the hat-shaped insulating member and an electrode rod extending axially of the outer electrode through the openings in the hat-shaped insulating member and the annular insulating member at opposite ends thereof and secured to the electrode tip at one end and to the annular insulating member at the other end in complete electrical insulation from the outer electrode, a handle secured to the outer electrode member at said one end thereof, means for applying an electrical potential between the outer and inner electrodes, means for mounting the probe in selected axial positions wherein the probe makes an obtuse angle with the direction of movement of the material so that one end of the probe extends different substantial distances into the granular material for surrounding the tip of the inner electrode and a portion of the outer electrode with moving granular material, means for pivotally mounting the probe and the means for mounting the probe in selected axial positions for providing movement of the electrode in an arcuate direction to maintain the pressure exerted on the probe by the moving granular material at a substantially constant value and means for varying the constant pressure secured to the means for mounting the electrode in selected axial positions.

3. Structure as set forth in claim 2 wherein the means for mounting the probe in selected axial positions comprises a collar movable longitudinally of the outer electrode into predetermined axial positions therealong having a radially outwardly extending annular flange and means for securing the collar to the outer electrode in selected axial positions.

4. Structure as set forth in claim 3 wherein the means for pivotally mounting the probe comprises a first elongated member extending parallel to the direction of movement of the granular material and secured at one end to a fixed support, a second elongated member extending parallel to said first member and secured at one end to the mounting collar, a first connecting link between the first and second elongated members pivotally connected at one end of the other end of the second elongated member and at the other end to the first elongated member centrally thereof and a second connecting link pivotally connected at one end to the other end of said first elongated member and pivotally connected at the other end to the second elongated member centrally thereof.

5. Structure as set forth in claim 3 wherein the means for pivotally mounting the probe comprises a first bracket secured to a fixed support, a second bracket adjustably secured to the radially extending flange of said collar and a pivotal connection between the first and second brackets.

6. Structure as set forth in claim 5 wherein the means for varying the constant pressure comprises a rigid linear member secured to the flange of the collar and extending in the direction of pivotal movement of the probe and at least one weight sleeved over the linear member for movement longitudinally thereof into selected positions therealong.

7. Structure as set forth in claim 6 and further including a mill for mulling the granular material, stationary mulling wheels located within the mill for moving the granular material therein and means for rotating the mill relative to the mulling wheels and wherein the pivotal mounting means for the probe is stationarily mounted adjacent the mulling wheels.

References Cited in the file of this patent
UNITED STATES PATENTS

| | | |
|---|---|---|
| 1,903,716 | Kolle | Apr. 11, 1933 |
| 2,316,875 | Laboulais | Apr. 20, 1943 |
| 2,437,134 | Smith | Mar. 2, 1948 |
| 2,608,604 | Hart | Aug. 26, 1952 |
| 2,626,423 | Collins | Jan. 27, 1953 |
| 2,653,298 | McKinley | Sept. 22, 1953 |
| 2,665,409 | Rodgers | Jan. 5, 1954 |
| 2,975,361 | Holaday | Mar. 14, 1961 |
| 3,040,251 | Dietert et al. | June 19, 1962 |